US011301562B2

(12) United States Patent
Tiwary et al.

(10) Patent No.: US 11,301,562 B2

(45) Date of Patent: Apr. 12, 2022

(54) FUNCTION EXECUTION BASED ON DATA LOCALITY AND SECURING INTEGRATION FLOWS

(71) Applicant: SAP SE, Walldorf (DE)

(72) Inventors: Mayank Tiwary, Rourkela (IN); Pritish Mishra, Bangalore (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 16/661,016

(22) Filed: Oct. 23, 2019

(65) Prior Publication Data

US 2021/0124822 A1 Apr. 29, 2021

(51) Int. Cl.

| | |
|---|---|
| ***G06F 9/455*** | (2018.01) |
| ***G06F 21/53*** | (2013.01) |
| ***G06F 9/54*** | (2006.01) |
| ***G06F 9/50*** | (2006.01) |
| ***G06F 16/2458*** | (2019.01) |

(52) U.S. Cl.

CPC .......... *G06F 21/53* (2013.01); *G06F 9/45558* (2013.01); *G06F 9/5083* (2013.01); *G06F 9/541* (2013.01); *G06F 16/2471* (2019.01); *G06F 2009/4557* (2013.01); *G06F 2009/45595* (2013.01)

(58) Field of Classification Search

None

See application file for complete search history.

(56) References Cited

U.S. PATENT DOCUMENTS

| | | | | |
|---|---|---|---|---|
| 10,764,244 | B1 * | 9/2020 | Mestery | G06F 8/36 |
| 2017/0346875 | A1 * | 11/2017 | Wells | G06F 9/5033 |
| 2020/0104296 | A1 * | 4/2020 | Hunn | G06F 16/2379 |
| 2020/0142711 | A1 * | 5/2020 | Varda | G06F 9/4484 |
| 2021/0096926 | A1 * | 4/2021 | Williams | H04L 67/34 |
| 2021/0124822 | A1 * | 4/2021 | Tiwary | G06F 16/2471 |
| 2021/0263779 | A1 * | 8/2021 | Haghighat | G06F 11/3409 |

OTHER PUBLICATIONS

Hall, et al., "An Execution Model for Serverless Functions at the Edge", Apr. 15-18, 2019, ACM, pp. 225-236. (Year: 2019).*

* cited by examiner

*Primary Examiner* — Kenneth Tang

(74) *Attorney, Agent, or Firm* — Buckley, Maschoff & Talwalkar LLC

(57) ABSTRACT

Some embodiments may be associated with a cloud-based computing environment. A WASM runtime may execute as serverless functions on an entity (VM or container) dynamically selected based on a data store location (associated with data locality and/or gravity). The WASM runtime may include one or more sandboxes each running a WASM module. A database service may access the data store, and the database service may execute on the same entity as the WASM runtime. In some embodiments, an orchestration layer selects the entity based on a default policy or user-defined custom rules in accordance with exposed attributes (CPU load, memory load, read/write mixture, etc.). According to some embodiments, the serverless functions execute in a multi-tenant fashion. Moreover, the WASM runtime process may use instruction set secure enclaves to secure an access host such that, even if a root is compromised, an attacker cannot access a sandbox memory heap.

24 Claims, 9 Drawing Sheets

800

| WASM RUNTIME PROCESS IDENTIFIER 802 | SANDBOX IDENTIFIER 804 | LOCALITY/GRAVITY INFORMATION 806 | DATABASE PROCESS IDENTIFIER 808 |
| --- | --- | --- | --- |
| W_101 | S_101 | | DB_101 |
| W_101 | S_102 | | DB_102 |

*FIG. 8*

FUNCTION EXECUTION BASED ON DATA LOCALITY AND SECURING INTEGRATION FLOWS

BACKGROUND

An enterprise may utilize applications or services executing in a cloud computing environment. For example, a business might utilize streaming applications that execute at a data center to process purchase orders, human resources tasks, payroll functions, etc. In some cases, a streaming application is associated with a low latency Service Level Agreement ("SLA") and, as a result, a cloud service provider may require effective methods for resource utilization. In a typical cloud-computing model where services are provisioned using Virtual Machines ("VMs") and/or containers, the service should not be stopped during no load and the resumed when a request for the service is received (such an approach would result in high time lag in each start or stop process for a VM or container). To overcome such challenges, a "serverless" computing architecture may let a developer write modular functions for services and these functions may be loaded only when a request arrives (and be turned off when no request arrives), sometimes referred to as a "Function-as-a-Service." For example, in the AWS® Lambda architecture a serverless function is executed within a container (for isolation purpose) and the orchestrator keeps the function hot for a predetermined period of time (and then tears it down).

Serverless computing architectures may feature relatively easy programmability and management and may also enable multi-tenancy at the data and compute layer while effectively utilizing computing resources (e.g., with a serverless approach, an executing function may not require dedicated provisioning of virtualized resources from the infrastructure layer) resulting in cost savings (because a customer only pay for the number of requests it makes). However, this approach comes with certain shortcomings such as "cold-start" (where, after tearing down of a serverless functions, re-provisioning may become costly and result in high latency for new in-coming requests). To minimize these effects, orchestrators may be desired that can execute functions without containers and, at the same time, provide a similar degree of resource isolation as offered by a container.

Web-Assembly ("WASM") is a binary instruction format which executes from a browser and is used to guarantee execution safety with its language features. With recent developments in enabling WASM to be executed outside the browser (enabling WASM to make system calls), support for a variety of languages to be compiled in WASM may make it suitable to be executed in a serverless fashion. However, when WASM executes as a sub-process (running via a runtime process) on a guest Operating System ("OS") it executes instructions in a relatively low privileged computational area (e.g., ring three of a Central Processing Unit ("CPU")), but if packaged as uni-kernels it may instead directly execute a relatively high privileged area (e.g., ring zero). However, when the serverless functions is executed on a virtualized resource and the dependent backing services (e.g., PostgreSQL) run on a different virtualized resource, this may cause a huge number of calls to the backing service (and often becomes a bottleneck for execution latency). This situation also creates a performance gap as compared to existing VM based solutions and might be bridged with stateful computation and data-aware function placement. It would be desirable to execute serverless functions in a cloud-based computing environment in a secure, automatic, and accurate manner.

SUMMARY

Methods and systems may be associated with a cloud computing environment. Some embodiments may be associated with a cloud-based computing environment. A WASM runtime may execute as serverless functions on an entity (VM or container) dynamically selected based on a data store location (associated with data locality and/or gravity). The WASM runtime may include one or more sandboxes each running a WASM module. A database service may access the data store, and the database service may execute on the same entity as the WASM runtime. In some embodiments, an orchestration layer selects the entity based on a default policy or user-defined custom rules in accordance with exposed attributes (CPU load, memory load, read/write mixture, etc.). According to some embodiments, the serverless functions execute in a multi-tenant fashion. Moreover, the WASM runtime process may use instruction set secure enclaves to secure an access host such that, even if a root is compromised, an attacker cannot access a sandbox memory heap.

Some embodiments comprise: means for executing a WASM runtime process as serverless functions on an entity (VM or container) dynamically selected based on a data store location (locality or gravity), wherein the WASM runtime process includes at least one sandbox running a WASM module; and means for accessing the data store by a database service, wherein the database service executes on the same entity as the WASM runtime process.

Other embodiments comprise: means for receiving, at a cloud provisioner platform from a gateway associated with a user, an API call to register serverless functions and REST endpoints; means for registering the REST endpoints and codebase; means for placing, by logic at a serverless orchestrator, execution of the serverless functions based on data location; after successful registration, means for asking, by the serverless orchestrator, a user to define custom forwarding logic based on exposed attributes; means for calling a central WASM compiler service to compile the codebase to WASM and return respective WASM modules; and means for calling a dynamic loader API of a WASM runtime process, wherein the dynamic loader loads the WASM modules to memory for execution and exposes the registered REST endpoints to the user.

Some technical advantages of some embodiments disclosed herein are improved systems and methods to execute serverless functions in a cloud-based computing environment in a secure, automatic, and accurate manner.

BRIEF DESCRIPTION OF THE DRAWINGS

FIG. 8 illustrates a web assembly database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein provide for a serverless runtime that executes WASM as functions and allows computing resource isolation. Moreover, the runtime may be capable of placing and executing serverless functions based on data locality or gravity (e.g., the execution of functions as close as possible to data). By placing the functions-based data locality dynamically in runtime, embodiments may enable relatively low-latency computing with less dependency on the network.

Figure 1:
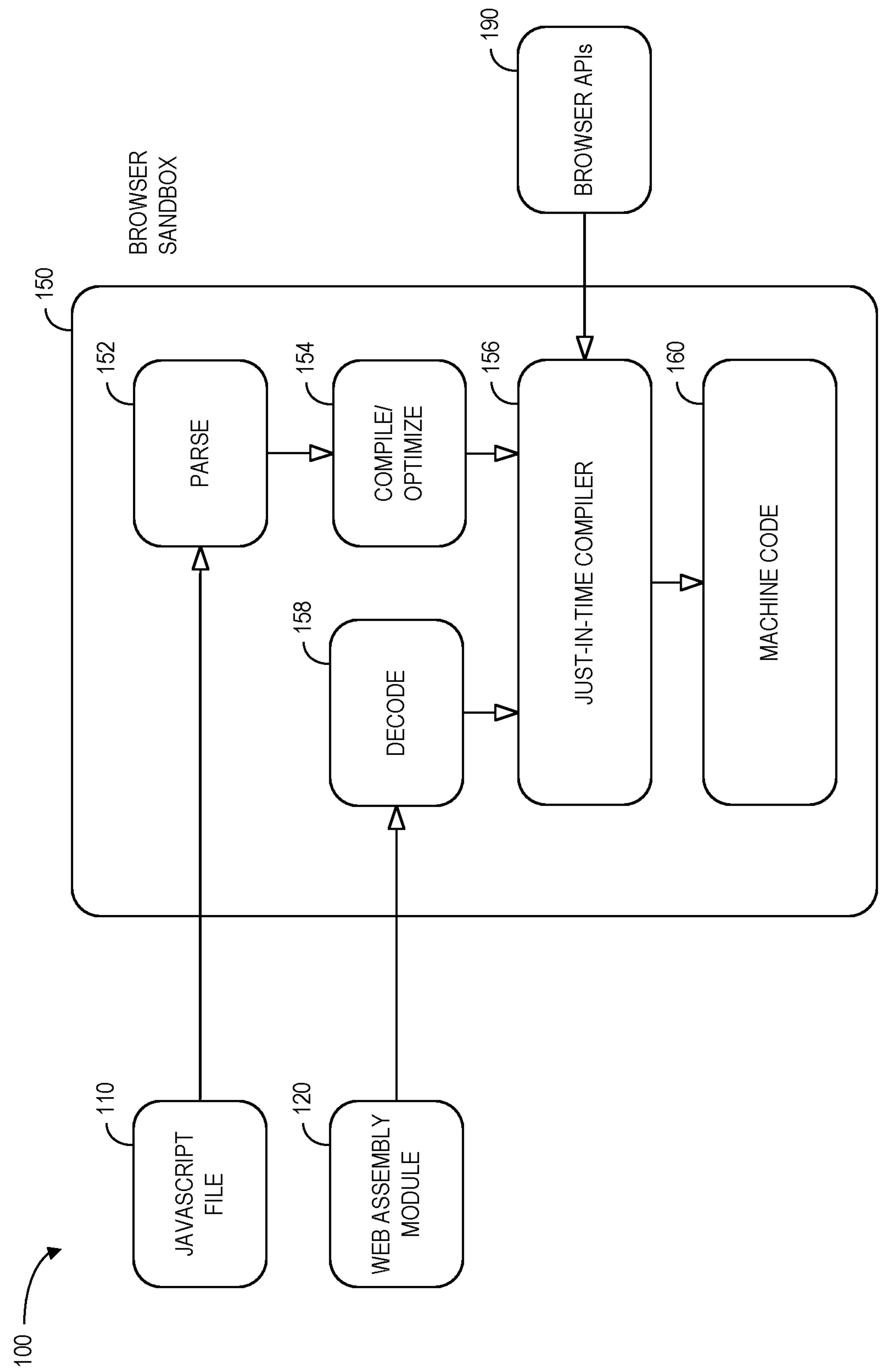
FIG. 1 is a high-level block diagram of web assembly system in accordance with some embodiments.

FIG. 1 is a high-level block diagram of a WASM system 100 in accordance with some embodiments. In particular, a browser sandbox 150 may execute a JavaScript file 110 and/or a web assembly module 120. For a JavaScript file 110, the browser sandbox 150 may utilize a parse element 152 and a compile/optimize element 154 before executing a Just-In-Tim ("JIT") compiler 156 (which may also receive browser Application Programming Interface ("API") data 190). For a web assembly module 120, the browser sandbox 150 may utilize a decode element 158 before executing the JIT compiler 156. In either case, the output of the JIT compiler may comprise machine code 160. According to some embodiments, the web assembly module 120 is a portable binary format designed to be: compact and fast to parse/load so it can be efficiently transferred, loaded, and executed by the browser; compatible with existing web platforms (e.g., to alongside JavaScript, allows calls to/from, access Browser APIs 190, etc.; and run in the same secure sandbox 150 as the JavaScript code 110. Note that higher-level languages can be compiled to a web assembly module 120 that is then run by the browser in the same sandboxed environment as the JavaScript code 110. Moreover, web assembly modules 120 compiled from higher-level languages may have been already parsed and compiled/optimized so they can go through a fast decoding phase (as the module is already in bytecode format close to machine code) before being injected into the JIT compiler 156. As a result, web assembly may represent a more efficient/faster way of running code in a browser, using any higher-level language that can target it for development, while being compatible with the existing web technologies.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 100 may store information into and/or retrieve information from various data stores, which may be locally stored or reside remote from the browser sandbox 150. Although a single browser sandbox 150 is shown in FIG. 1, any number of such devices may be included. Moreover, various devices described herein might be combined according to embodiments of the present invention. For example, in some embodiments, the parse element 152 and compile/optimize element 154 might comprise a single apparatus. The system 100 functions may be performed by a constellation of networked apparatuses, such as in a distributed processing or cloud-based architecture.

A user may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 100.

Cloud computing may demand scalable computing in terms of resource and energy utilization. In some cases, resource utilizations and on-demand provisioning may involve massive data distributions. In serverless computing, developers may need to write functions that execute only when demand comes and keep the resources free at other times. However, existing serverless computing techniques may have limitations in terms of cold-start, a complex architecture for stateful services, problems implementing multi-tenancy, etc. Some embodiments described herein utilize a WASM based runtime that may address some of the existing problems in current serverless architectures. The WASM based runtime may feature resource isolation in terms of CPU, memory, and/or files (and thus offer multi-tenancy within function execution). Further, some embodiments may provide serverless functions that are placed and executed based on data locality and/or gravity (which may help improve execution latency and reduce network usage as compared to existing random function placement strategies).

WASM is a binary format of compilation target for high level languages and a low-level bytecode for the web. It is designed as an abstraction for an underlying hardware architecture and runs in an isolated sandbox environment, providing platform independence for programmers. Most high-level languages (e.g., C, C++, and RUST) that run on a system can also be converted to WASM to offer near-native speed of execution by leveraging common hardware capabilities. The main problem that WASM aims to solve is that while large applications take a long time to start, a WASM solution should provide a significant increase in compilation time but execute faster. Although Java sits promises "Write once, Run Anywhere," it doesn't solve the process of standard byte code (a common compiler for all languages. WASM and provides a platform independent, cross-compilation target for many languages at native-speed. The performance benefits from the same may provoke malware authors to intrude. To address this, WASM follows a linear memory model similar to languages such as C and C++ which mostly perform dynamic memory allocations via a memory allocator such that opcodes accessing memory are not given a memory address (instead they are given an offset to the beginning of a linear segment). In this way, the linear memory is sandboxed and isolated from other data structures and concurrent processes. Such an approach may have the downsides of a compiled target language (e.g., it may be more difficult to debug by matching the resulting code to the actual code). Since WASM is also built for other languages, it leverages the solution that is already being developed: it uses the same source maps for easy debugging by mapping the generated code to the original code representation. With the advent of WASM, major companies such as MOZILLA®, GOOGLE®, MICROSOFT®, and APPLE® have agreed on a standard byte code and formed an active community group in the World Wide Web Consortium ("W3C"). Considering WASM usage and peak performance aspects, design features are being added to support other, non-web environments. Examples of design improvements include garbage collection, allowing for parallelism via threads, etc.

Many business application workloads have been migrating from an on-premise approach to a cloud-based computing environment. In a cloud implementation, from virtualization to containerization and now to serverless, each technique may take over the advantage of others. Virtualization offers a hardware abstraction layer but adds substantial overheads to maintain the OS and workload distribution. Compared to virtualization, containers may be strong candidates to compete with isolation (and may offer a way of reducing cost and increasing deployment speed and portability). With serverless execution models, however, containers suffer from the cold start problem. Following VMs and containers, the next wave of computing may be associated with a serverless approach. The main goal of serverless is to offer developers a straightforward way to write code code (without worrying about maintaining and running the service). Instead of being deployed to VMs or running on containers, routines are launched when they called. In this way, only demanded serverless functions are invoked, and, based on demand, resources can be scaled accordingly. This reduces the cost of idle capacity and makes serverless functions scalable when needed.

A cold-start occurs when a cloud function is invoked for the first time (or after a long time of not being used). This is because, when a serverless application scales up to a level, one of the workers may need to be assigned as a container to start the application. This process may involve downloading files, applying settings, loading a code module, and/or executing the service. The container will be intact for some period of time (and after that, when another event occurs, if room is required the existing container will get destroyed and/or taken-off the memory by writing the states). When the container is taken off the memory, and a new API request arrives for the same service, the container needs to be re-loaded causing a delay each time during the re-loading process. Generally, invoking a function provisioned through a container may involve resource provisioning, getting the container started up, starting functions, and then executing those functions. The problem may only become worse when function developers come up with workarounds to avoid startup delays (e.g., artificially activating functions to avoid container shutdown, over provisioning resources required to run their functions to secure a container that is harder to evict due to difficulty in acquiring resources, etc.). However, the WASM execution model does not require a container to be instantiated (which avoids cold-start problems) or can directly be executed on a bare system having proper WASM runtime support.

Given the advantages and features of WASM, some embodiments described herein utilize runtimes for WASM, which can run outside the browser accompanied with resource isolations. The WASM modules may be placed and executed based at least in part on data location. As used herein, the phrase "data location" may refer to, for example, data locality (e.g., locating computation close to where the data is actually stored) and/or data gravity (e.g., the ability of data to attract applications, services, and other data).

Traditionally, WASM runtimes were executed within the browser process. Note, however, a WASM runtime can also get executed as a standalone or outside of a browser if the runtimes are accompanied with interfaces that can facilitate system calls. According to some embodiments, the WASM runtimes execute as a separate process which runs a given WASM function using a thread. The WASM runtime process can be provisioned easily with a VM or container (or can even run on a bare machine or a host OS directly).

Figure 2:
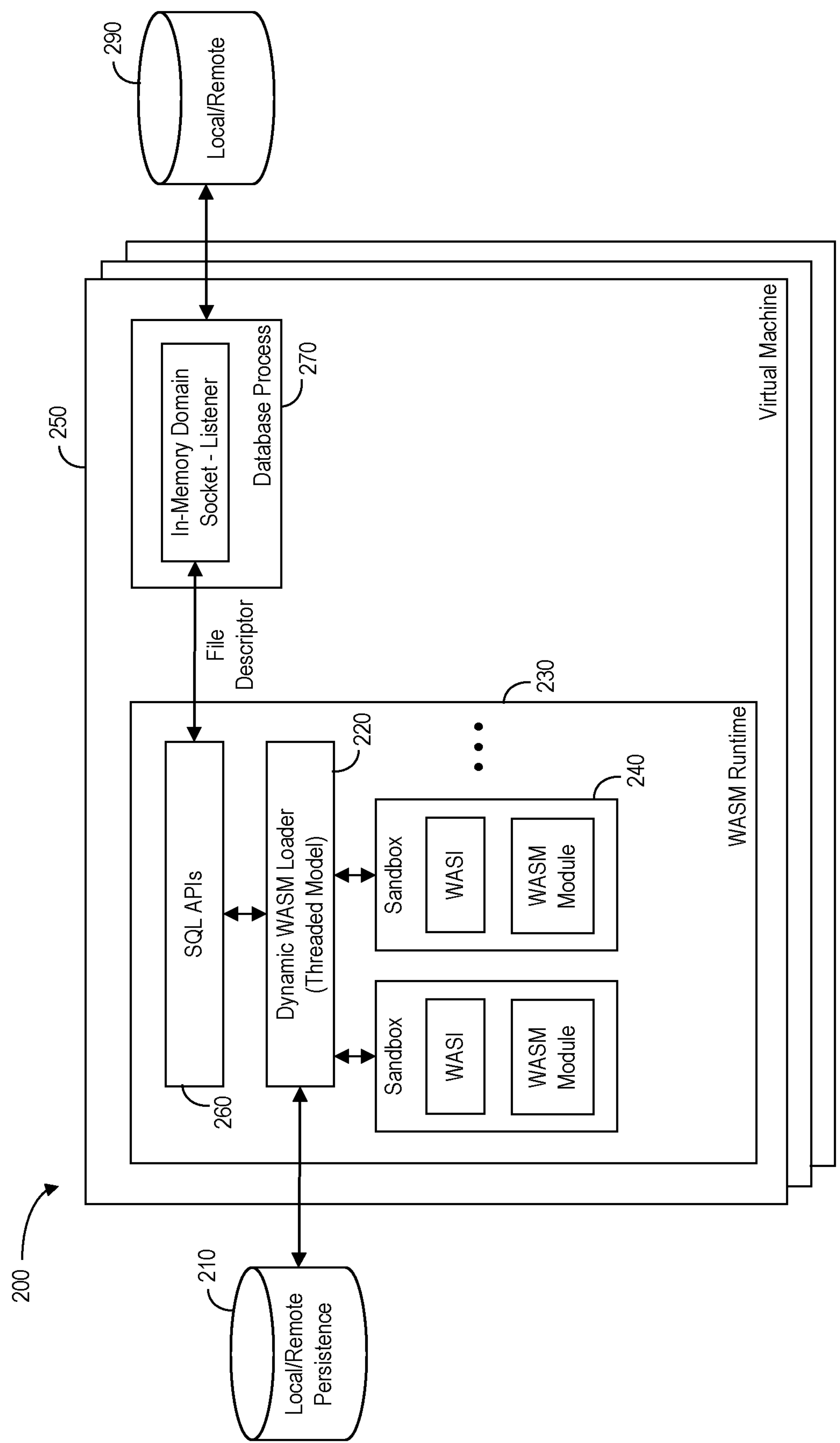
FIG. 2 is a system architecture of a web assembly process running on service instances according to some embodiments.

In some embodiments, the runtime executes on the same container/VM where the database or backing service instances execute. For example, FIG. 2 is a system 200 architecture of a WASM process running on service instances according to some embodiments. In particular, a VM 250 includes a WASM runtime 230 and a database process 270. The WASM runtime 230 may contain Structured Query Language ("SQL") Application Programming Interfaces ("APIs") 260 that communicate with an in-memory domain socket-listener of the database process 270 (e.g., associated with local/remote storage 290). The WASM runtime 230 may also include a dynamic WASM loader (threaded model) 220 to exchange information with local/remote persistence 210 and/or sandboxes 240 (e.g., each having a Web Assembly System Interface ("WASI") and WASM module).

According to some embodiments, the database VM 250 now also has a WASM runtime 230 process running along with the core database service. The WASM runtime 230 process acts as a glue between the host and WASM modules. When any of the SQL API 260 is triggered, it in turn triggers the function responsible for execution of the API endpoint. Suppose, for example, that the SQL API 260 endpoint related to "CREATE TABLE" is triggered. This, in turn, should ideally execute a function implemented by the database source module. Consider this function create_table_db( ). According to some embodiments, this function has been compiled to a WASM module "create_table_db.wasm." This WASM module executes inside a sandbox 240 having its own memory space and isolation. However, at this point this "create_table_db.wasm" cannot execute as expected because the module is in a sandbox mode (and cannot access the system calls on the host system). Thus, it needs a glue that translates the call to trigger a call on the host system. WASI is a standardized implementation provided for implementing the necessary system calls and, in turn, exposing functions that could be consumed by a WASM module. For example, if the "create_table_ db.wasm" uses a function that opens a file and writes content, e.g., "open_file( )," this function cannot invoke an open file instruction on the host system. Instead, the WASI module must expose/export a function called "open_file( )" which must then be consumed by the WASM module for the flow to be intact. Internally, the "open_file( )" function in the WASI layer implements the low-level system calls and acts as a uniform wrapper to be consumed by any WASM module. The runtime environment of these WASM modules is defined by the WASM runtime 230 (e.g., WASMer, Lucet, etc.).

Finally, the proposed system 200 architecture introduces the dynamic WASM loader 220, which is one-of-its-kind in this domain. The dynamic WASM loader 220 might, for example, when there is any code modification of a function implemented on the database layer (or there is an additional functionality which has been introduced at the database layer) automatically compile these changes into WASM modules and integrate them into the WASM runtime 230 seamlessly. Thus, if the SQL API 260 related to this modified or new function is triggered, the WASM module automatically executes the corresponding compiled WASM. The use of this approach is self-evident, if this dynamic loader 220 is not present then any modification/addition to the database layer would necessitate an undesirable re-configuration of the entire system. The database process 270 keeps on listening to the configured domain socket. The other processes that try to access the file descriptor should have read/write access. In this case, the WASM runtime 230 uses the same file descriptor as exposed by the database process.

Figure 3:
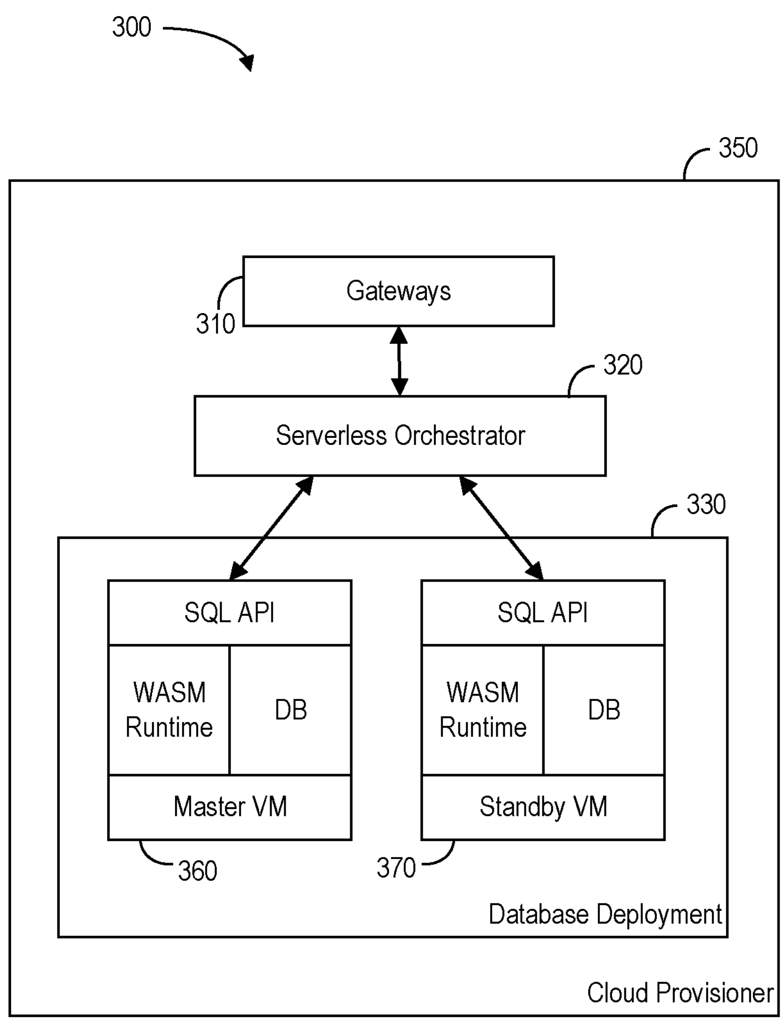
FIG. 3 is a system with a web assembly orchestrator deployed on a cloud provisioner in accordance with some embodiments.

FIG. 3 is a system 300 with a WASM serverless orchestrator 320 deployed on a cloud provisioner 350 in accordance with some embodiments. The serverless orchestrator 320 communicates with gateways 310 and a databased deployment 330 associated with a master VM 360 and a standby VM 370 (each having an SQL API, WASM runtime, and database). The serverless orchestrator 320 may manage optimal function placement with respect to data location (e.g., gravity or locality). The database deployment 330 contains all database VMs, where one can be the master VM 360 and the others can be standby VMs 370. The serverless orchestrator 320 receives the API requests and, based on defined logic, forwards the requests to one of the DB VMs 360, 270. Each VM has a database process ("DB") running and a WASM runtime as described with respect to FIG. 2. According to some embodiments, there may be different attributes upon which the orchestrator 320 selects a VM 360, 370. The attributes might include, for example: load of the master VM 360, type of query (read or write), etc. The orchestrator 320 maintains a flow path in a key-value pair and the key-value store is subject to change based on the defined logic defined. The key is the URL or endpoint and value stores the respective VM to which the request needs to be forwarded. This logic may even be open to a customer based on business requirements, workload nature, etc. Based on the key-value pairs, the orchestrator 320 hits the configuration API exposed by a VM's WASM runtime to get the function/WASM module in local persistence. Also, whenever there is a change triggered in the key-value pair, the orchestrator 320 updates the WASM runtimes in respective database VMs.

According to some embodiments, the WASM based execution runtime offers a sandboxed execution environment. The WASM runtime may, for example, create a continuous memory heap for each sandbox and no pointers from inside the sandbox can access outside memory. To allow system calls for instructions executing inside the sandbox, during compilation of WASM the pointers are detected and offsets can be passed to interfaces to enable system interactions (e.g., a WASI-WASM system interface). In order to prevent access from outside the WASM sandbox into sandbox heap memory, some embodiments rely on a security enclave such as the Security Guard Extensions ("SGX") architecture available from INTEL®. Any process running in user-space might get compromised using a root access. As a result, it is possible that the WASM runtime process can get compromised (which can allow data leaks from the WASM heaps or sandboxes). According to some embodiments, a runtime may use an SGX instruction set with native RUST features to create enclaves. Later, the WASM heaps are protected by using SGX instructions and executing the WASM in the enclaves where security is ensured by hardware. Such a system interface may provide protection when WASM functions are executed outside of a browser.

Further, with a threaded model (where each thread executes a WASM function) CPU isolation may be achieved by setting a timer on the thread and then executing a handler to remove the WASM module after the time expires. A proposed runtime, in some embodiments, may achieve file-system isolation by separating disks and mounting disks for each runtime process. Further, using the principles of capability-based security the runtime may assigns file descriptors (fds) to WASM functions in a controlled manner.

Additional security features of the WASM runtime might include, according to some embodiments:

- separation of execution stack from heap (avoiding buffer overflow attacks);
- prohibiting direct references to function pointers to control the instruction pointer and thereby ensuring WASM data integrity;
- prohibiting access to system calls by default and exposing only needed file descriptors to the specific WASM module (similar to capability-based security models to reduce an attack surface).

Some embodiments described herein may be provisioned on any cloud-provisioner such as Kubernetes or Cloud-Foundry and can run within VM or containers. Embodiments may create the WASM runtime using RUST, which has: (i) a dynamic WASM loader, (ii) a memory scaller, (iii) a registration module, and (iv) a serverless orchestrator. The flow may begin with a first user making a call to a platform (cloud provisioner) API to register the functions and REST endpoints. This call can be received (from a gateway) by a custom provisioner operator in the case of Kubernetes or a function registration service exposed by Cloud Foundry. The custom operator or function registration service registers the REST endpoint and codebase (in any language such as JAVA, C, C++, etc.) URL (e.g., a git repository) into a Custom Resource Definitions ("CRD") data store as a key-value pair in case of Kubernetes (or a database in Cloud Foundry). The serverless orchestrator contains logic that places execution of the functions based on data location (e.g., locality and/or gravity).

After the registration is successful, the serverless orchestrator asks the user to define a custom logic based on exposed attributes (such as load in terms of CPU or memory, or read/write mix, etc.) and also gives users a pre-defined rule-set as a default. One example of a pre-defined rule set is: executing all write functions (functions which make write calls to a database) to the master node of the respective database deployment and executing all read functions (functions which only read from a database) to slave nodes of the database deployment. After the forwarding logic is defined at the serverless orchestration logic, the orchestrator makes a call to a central WASM compiler service (WASI enabled), which compiles the given codebase to WASM and returns respective WASM modules. The orchestrator then makes a call to a dynamic loader API of the runtime, which loads the WASM module to memory for execution and exposes the registered REST endpoint to the user. Now when a user makes a call to the registered REST endpoint, the respective WASM modules are executed and return the results to users or applications. While loading the module to memory, the dynamic loader calls the memory scaller module, which knows the maximum memory to be allocated to any given WASM module. The memory scaller creates a heap of memory of any step size (e.g., initially using calloc( )) or malloc( ) and assigns the continuous memory heap to the WASM module for execution. Anytime during execution when the WASM modules try to access memory whose offset is more than the initial memory allocated (the WASM module requires more memory than the initial step size assigned during runtime), the scaller checks if the current heap size is less than the maximum limit. If so, the scaller creates another, larger memory heap (e.g., the initial step size plus another unit size) and reassigns the WASM module to it. If, however, the memory has already reached the limit, the scaller instead returns segmentation fault.

According to some embodiments, both processes (WASM runtime and database process) run on the same VM/container. Note that the two processes usually communicate with each other using a TCP network socket. However, an inter-process communication over a TCP network socket can lead to unnecessary network overhead such as TCP three-way handshakes, handling acknowledgements, encapsulation processes, crossing different layers of firewalls, etc. In addition, WASM modules may run on its own heap and isolated context to achieve, security-wise, a sandbox way of executing the function. To avoid such complications, embodiments may adopt inter-process communication in Unix by using the concept of domain sockets. Most of the modern databases, such as PostgreSQL, allow talking to database process directly via domain sockets. With domain sockets, a common file descriptor may be exposed to both processes which then active listen for the same file descriptor.

Figure 4:
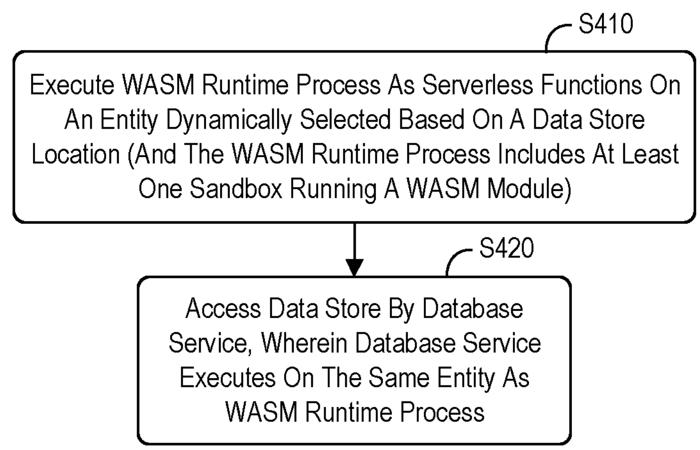
FIG. 4 is a method according to some embodiments.

FIG. 4 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, the system may execute a WASM runtime process as serverless functions on an entity (VM or container) dynamically selected based on a data store location (locality or gravity), wherein the WASM runtime process includes at least one sandbox running a WASM module. At S420, the system may access the data store by a database service, wherein the database service executes on the same entity as the WASM runtime process.

Figure 5:
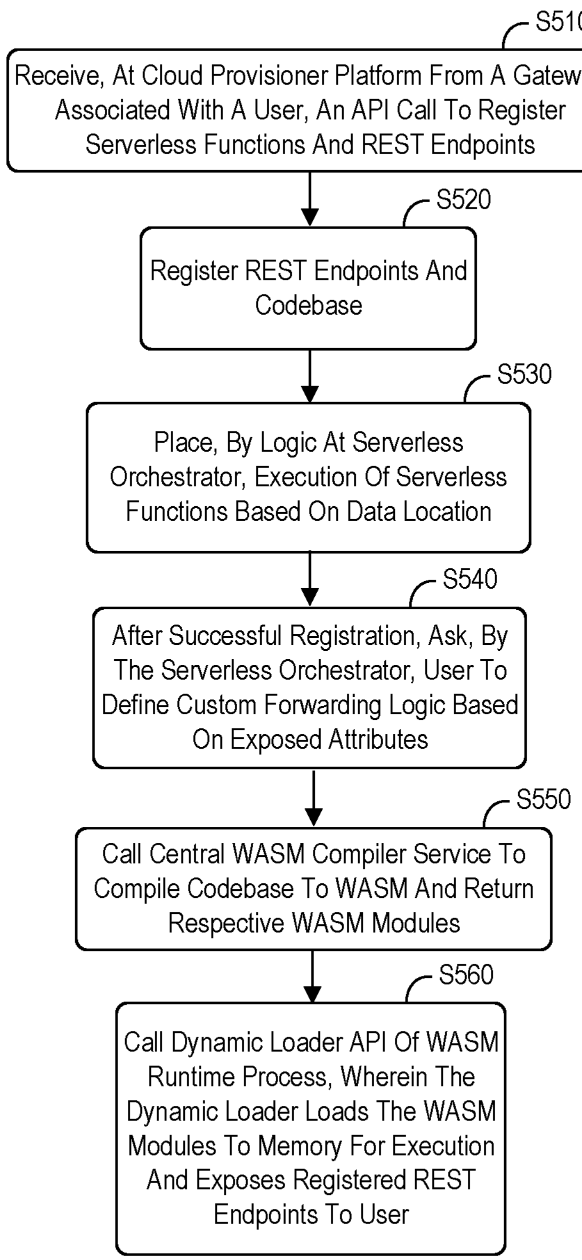
FIG. 5 is a method according to some embodiments.

FIG. 5 is a method that might performed by some or all of the elements of any embodiment described herein. At S510, a cloud provisioner platform may receive from a gateway associated with a user, an API call to register the serverless functions and REST endpoints. The call from the gateway might be associated with, for example, a Kubernetes custom provisioner operator or a Cloud Foundry function registration service. At S520, the system may register the REST endpoints and codebase. At S530, the system may place, using logic at a serverless orchestrator, execution of the serverless functions based on data location (e.g., locality or gravity). At S540, after successful registration, the serverless orchestrator may ask a user to define custom forwarding logic based on exposed attributes. At S550, the system may call a central WASM compiler service to compile the codebase to WASM and return respective WASM modules. At S560, the system may call a dynamic loader API of a WASM runtime process, wherein the dynamic loader loads the WASM modules to memory for execution and exposes the registered REST endpoints to the user.

Figure 6:
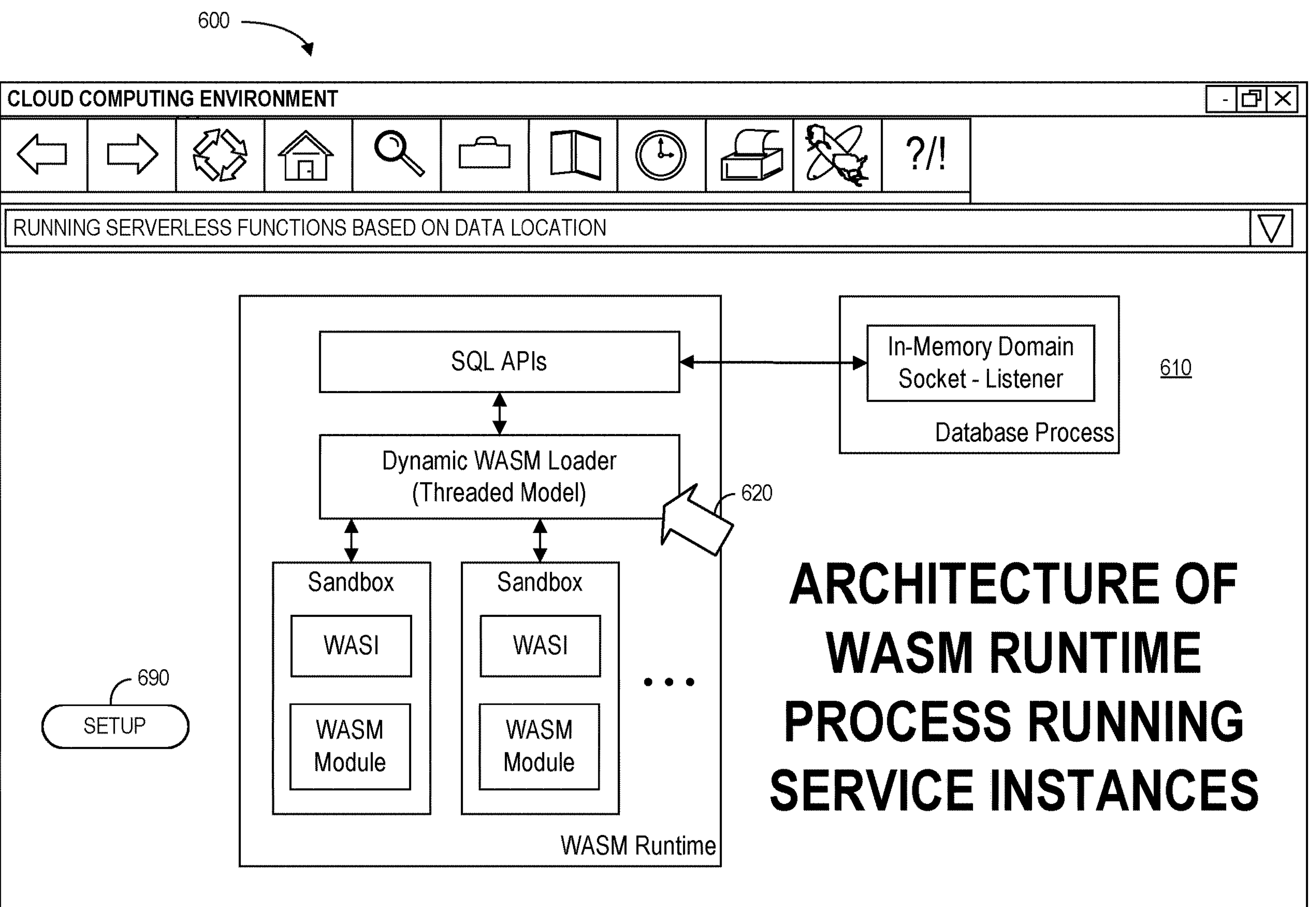
FIG. 6 is a human machine interface display according to some embodiments.

FIG. 6 is a human machine interface display 600 in accordance with some embodiments. The display 600 includes a graphical representation 610 of elements of a cloud-based WASM runtime process running service instances. Selection of an element (e.g., via a touch-screen or computer pointer 620) may result in display of a pop-up window containing various options (e.g., to adjust rules or logic, assign various machine or devices, etc.). The display 600 may also include a user-selectable "Setup" icon 690 (e.g., to configure parameters for cloud management/provisioning to alter or adjust processes as described with respect any of the embodiments of FIGS. 2 through 5).

Figure 7:
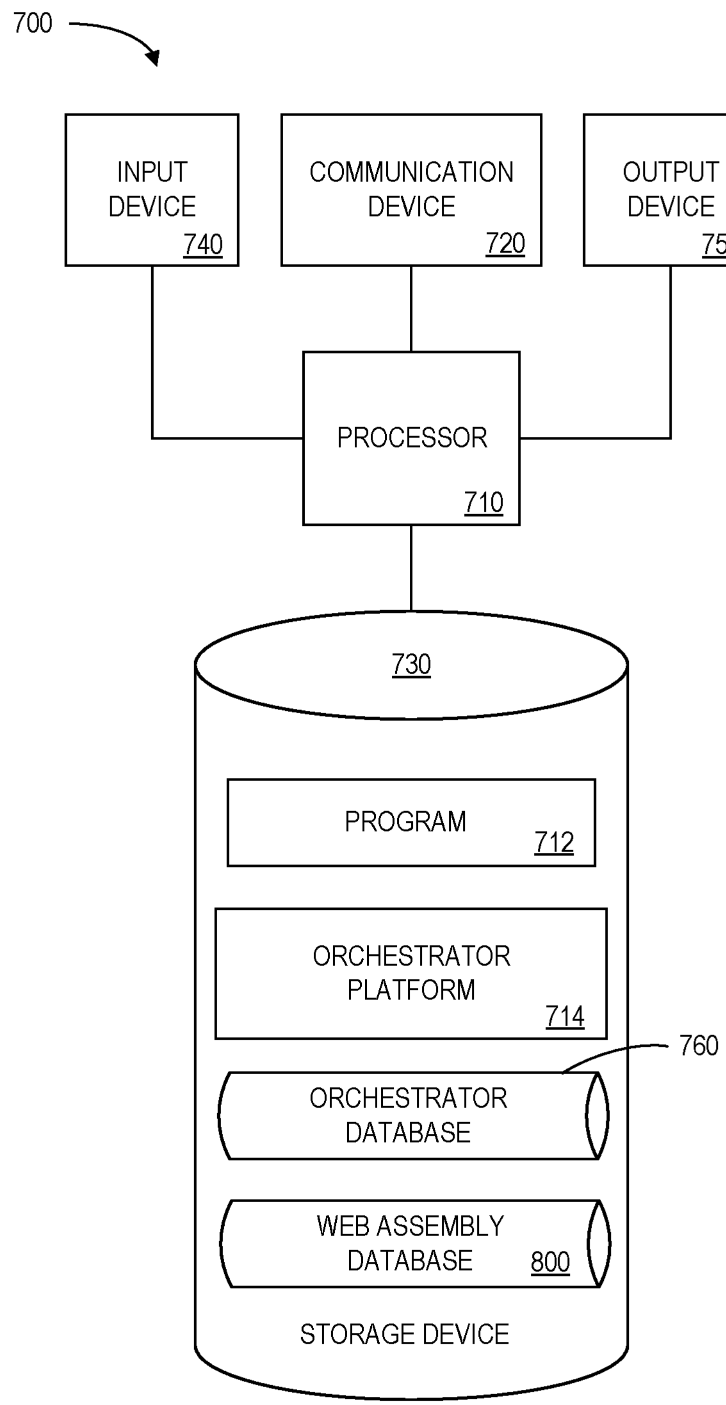
FIG. 7 is an apparatus or platform according to some embodiments.

Note that the embodiments described herein may be implemented using any number of different hardware configurations. For example, FIG. 7 is a block diagram of an apparatus or platform 700 that may be, for example, associated with the system 200 of FIG. 2 (and/or any other system described herein). The platform 700 comprises a processor 710, such as one or more commercially available CPUs in the form of one-chip microprocessors, coupled to a communication device 760 configured to communicate via a communication network (not shown in FIG. 7). The communication device 760 may be used to communicate, for example, with one or more remote user platforms, cloud resource providers, etc. The platform 700 further includes an input device 740 (e.g., a computer mouse and/or keyboard to input rules or logic) and/an output device 750 (e.g., a computer monitor to render a display, transmit recommendations, and/or create data center reports). According to some embodiments, a mobile device and/or PC may be used to exchange information with the platform 700.

The processor 710 also communicates with a storage device 730. The storage device 730 can be implemented as a single database or the different components of the storage device 730 can be distributed using multiple databases (that is, different deployment information storage options are possible). The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or orchestrator platform 714 for controlling the processor 710. The processor 710 performs instructions of the programs 712, 714, and thereby operates in accordance with any of the embodiments described herein. For example, the processor 710 may execute as serverless functions on an entity (VM or container) dynamically selected based on a data store location (associated with data locality and/or gravity). The WASM runtime may include one or more sandboxes each running a WASM module. A database service may access the data store, and the database service may execute on the same entity as the WASM runtime. In some embodiments, the processor 710 may arrange for an orchestration layer to select the entity based on a default policy or user-defined custom rules in accordance with exposed attributes (CPU load, memory load, read/write mixture, etc.). According to some embodiments, the serverless functions execute in a multi-tenant fashion. Moreover, the processor 710 may use instruction set secure enclaves to secure an access host such that, even if a root is compromised, an attacker cannot access a sandbox memory heap.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores an orchestrator database 760 and a web assembly database 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Referring to FIG. 8, a table is shown that represents the web assembly database 800 that may be stored at the platform 800 according to some embodiments. The table may include, for example, entries mapping cloud resources (e.g., for a cloud provider) that may be utilized by applications. The table may also define fields 802, 804, 806, 808, for each of the entries. The fields 802, 804, 806, 808 may, according to some embodiments, specify: a WASM runtime process identifier 802, a sandbox identifier 804, locality/gravity information 806, and a database process identifier 808. The web assembly database 800 may be created and updated, for example, when a new WASM runtime process is initiated, there are updates to locality or gravity, etc. According to some embodiments, the web assembly database 800 may further store details about tenants, security information, mappings, etc.

The WASM runtime process identifier 802 might be a unique alphanumeric label or link that is associated with a particular WASM runtime process being executed on a VM or container. The sandbox identifier 804 might identify a WASM sandbox associated with the runtime (e.g., and as shown in FIG. 8 multiple sandbox identifiers may be associated with a single WASM runtime process identifier "W_101"). The locality/gravity information 806 might be used to select a particular VM or container, and the database process identifier 808 might identify a process that accesses information in a data store.

Thus, embodiments may execute serverless functions in a cloud-based computing environment in a secure, automatic, and accurate manner. Moreover, multiple tenants may operate in separate sandboxes (with access to different memories) improving the security of the system. Given the recent advancements using web-assembly to make system calls, in some embodiments a RUST based execution runtime may facilitate execution of serverless functions via web-assembly modules. The runtime may facilitate the placements of WASM functions based on data locality or gravity, and (at the same time) offer computing resource isolations in terms of CPU, memory and file system to help achieve multi-tenancy in terms of executing serverless functions. Further, some embodiments leverage the runtime features to reduce performance impact and may utilize streaming or machine learning based applications. Note that cloud systems may be are highly resource constrained in terms of computing, storage, and/or network, and a WASM-based framework may allow for better resource utilization. Placing functions based on data locality and/or gravity is one step toward achieving stateful computing services. Embodiments may be associated with different distributed storage architectures in order to leverage stateful computing services.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
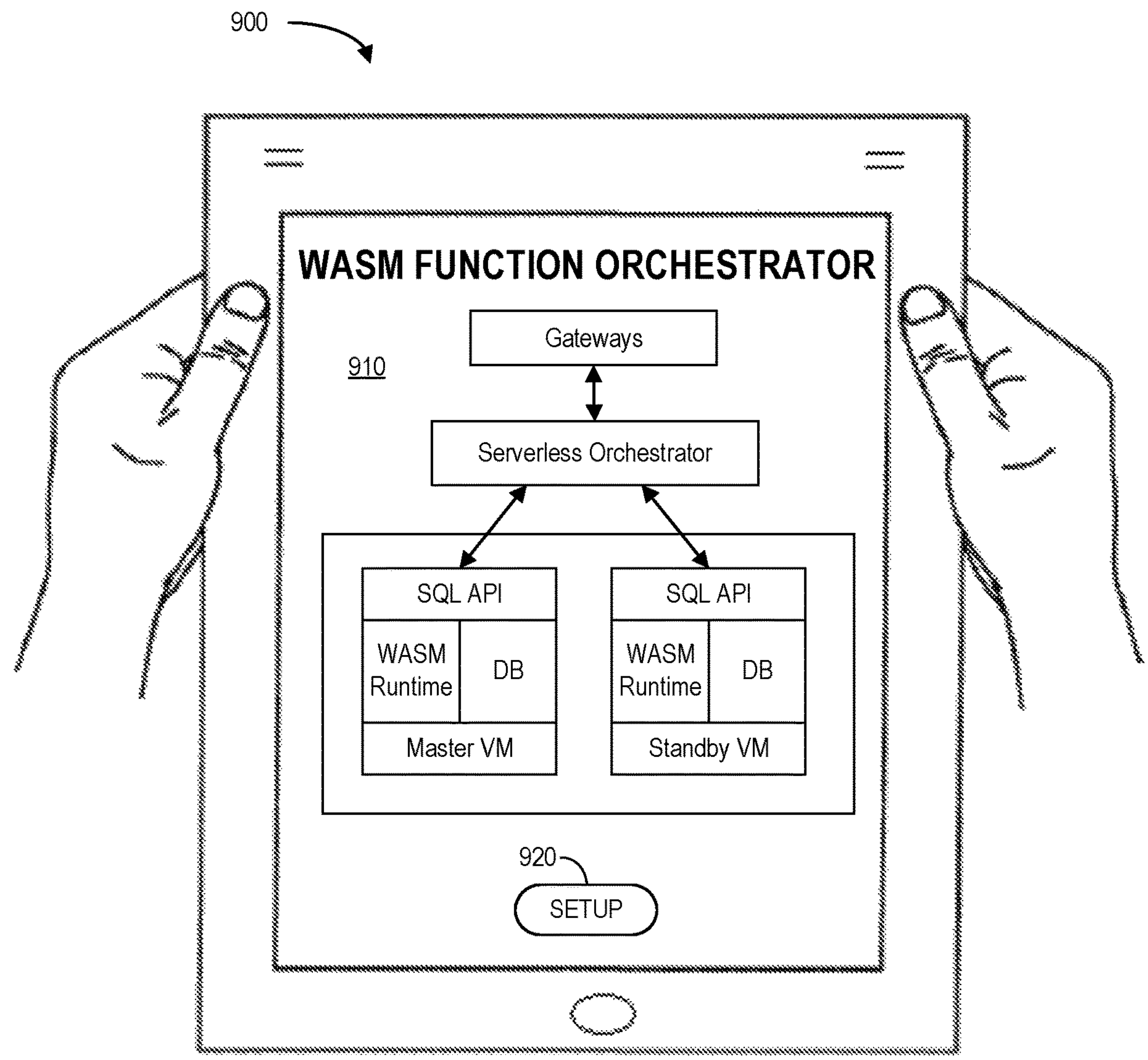
FIG. 9 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 9 shows a tablet computer 900 rendering a WASM function orchestrator display 910. The display 910 may, according to some embodiments, be used to view more detailed elements about components of the system (e.g., when a graphical element is selected via a touchscreen) or to configure operation of the system (e.g., to establish new rules or logic for the system via a "Setup" icon 920).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, comprising:

a Web Assembly ("WASM") runtime process executing as serverless functions on a Virtual Machine ("VM") dynamically selected based on a data store location, including:

at least one sandbox running a WASM module;

a database service to access the data store, wherein the database service executes on the same VM as the WASM runtime process; and an orchestration layer that selects the VM based on a policy that provides:

if a Representational State Transfer ("REST") API request is for a write query, a function gets executed on a master VM, and if the REST API request is for a read request, the function gets executed on a standby VM.

2. The system of claim 1, wherein other WASM runtime processes execute as serverless functions on containers.

3. The system of claim 1, wherein the selection based on the data store location is associated with at least one of: (i) data locality, and (ii) data gravity.

4. The system of claim 1, wherein the WASM runtime process further includes:

Structured Query Language ("SQL") Application Programming Interfaces ("APIs").

5. The system of claim 4, wherein the SQL APIs exchange file descriptors with the database service via an in-memory domain socket-listener.

6. The system of claim 4, wherein the serverless functions use exposed SQL APIs from the WASM runtime process to communicate via Inter-Process Communication ("IPC") domain sockets.

7. The system of claim 1, wherein the WASM runtime process further includes:

a dynamic WASM loader associated with local and/or remote persistence.

8. The system of claim 7, wherein the dynamic WASM loader offers dynamic loading of serverless functions in substantially real-time by changing API mappings to WASM mappings in memory and modifying memory pointers during runtime.

9. The system of claim 7, wherein the WASM runtime process further includes:

a plurality of sandboxes, each running a Web Assembly System Interface ("WASI").

10. The system of claim 9, wherein the serverless functions execute in a multi-tenant fashion.

11. The system of claim 10, wherein the WASM runtime process uses instruction set secure enclaves to secure an access host such that, even if a root is compromised, an attacker cannot access a sandbox memory heap.

12. The system of claim 11, wherein the WASM runtime process offers, for each sandbox, system isolation for: (i) a central processing unit, (ii) memory, and (iii) files.

13. The system of claim 12, wherein the WASM runtime process offers no direct references to function pointers that control the instruction pointer to ensure data integrity.

14. The system of claim 13, wherein the WASM runtime process prevents access to system calls by default.

15. The system of claim 1, wherein the policy comprises a default policy.

16. The system of claim 15, wherein the default policy utilizes round robin load balancing across database VMs.

17. The system of claim 1, wherein an orchestration layer includes:

a computer processor, and a memory storage device including instructions that when executed by the computer processor enable the system to:

(i) select the VM for the serverless functions based on user-defined custom rules in accordance with exposed attributes.

18. The system of claim 17, wherein the exposed attributes are associated with at least one of: (i) a central processing unit load, (ii) a memory load, and (ii) a read/write mixture.

19. A non-transitory, computer readable medium having executable instructions stored therein that, when executed by a computer processor cause the processor to perform a method associated with a cloud-based computing environment, the method comprising:

executing a Web Assembly ("WASM") runtime process as serverless functions on a Virtual Machine ("VM") dynamically selected based on a data store location, wherein the WASM runtime process includes at least one sandbox running a WASM module;

accessing the data store by a database service, wherein the database service executes on the same VM as the WASM runtime process; and selecting, by an orchestration layer, the VM based on a policy that provides:

if a Representational State Transfer ("REST") API request is for a write query, a function gets executed on a master VM, and if the REST API request is for a read request, the function gets executed on a standby VM.

20. The medium of claim 19, wherein other WASM runtime processes execute as serverless functions on containers.

21. The medium of claim 20, wherein the selection based on the data store location is associated with at least one of: (i) data locality, and (ii) data gravity.

22. A computerized method associated with a cloud-based computing environment, comprising:

executing a Web Assembly ("WASM") runtime process as serverless functions on a Virtual Machine ("VM") dynamically selected based on a data store location, wherein the WASM runtime process includes at least one sandbox running a WASM module;

accessing the data store by a database service, wherein the database service executes on the same VM as the WASM runtime process; and selecting, by an orchestration layer, the VM based on a policy that provides:

if a Representational State Transfer ("REST") API request is for a write query, a function gets executed on a master VM, and if the REST API request is for a read request, the function gets executed on a standby VM.

23. The method of claim 22, wherein other WASM runtime processes execute as serverless functions on containers.

24. The method of claim 22, wherein the selection based on the data store location is associated with at least one of: (i) data locality, and (ii) data gravity.

* * * * *